(12) United States Patent
Toussaere et al.

(10) Patent No.: US 7,027,376 B2
(45) Date of Patent: Apr. 11, 2006

(54) METHOD FOR OPTICAL DATA RECORDING AND REPRODUCING

(75) Inventors: Eric Toussaere, Chatillon (FR); Joseph Zyss, Sceaux (FR)

(73) Assignees: France Telecom, (FR); Centre National de la Recherche Scientifique (CNRS), (FR); Ecole Normale Superieure de Cachan, (FR)

( * ) Notice: Subject to any disclaimer, the term of this patent is extended or adjusted under 35 U.S.C. 154(b) by 408 days.

(21) Appl. No.: 10/182,923

(22) PCT Filed: Jan. 3, 2001

(86) PCT No.: PCT/FR01/00016

§ 371 (c)(1),
(2), (4) Date: Nov. 4, 2002

(87) PCT Pub. No.: WO01/50465

PCT Pub. Date: Jul. 12, 2001

(65) Prior Publication Data

US 2003/0123117 A1    Jul. 3, 2003

(30) Foreign Application Priority Data

Jan. 4, 2000    (FR)    ................................ 00 00041

(51) Int. Cl.
G11B 7/00    (2006.01)

(52) U.S. Cl. .......................................... 369/103; 359/3

(58) Field of Classification Search ................ 369/103; 359/3
See application file for complete search history.

(56) References Cited

U.S. PATENT DOCUMENTS 4,953,924 A * 9/1990 Redfield et al. ................ 359/7
5,384,221 A * 1/1995 Savant et al. .................. 430/19
6,452,890 B1* 9/2002 Kawano et al. ........ 369/110.01

* cited by examiner

*Primary Examiner*—A Psitos
(74) *Attorney, Agent, or Firm*—Blakely Sokoloff Taylor & Zafman

(57) ABSTRACT

The invention concerns a method for optical recording of data on a photosensitive storage medium, characterized in that the data are encoded according to different possible states for the various components of a non-linear susceptibility tensor of the photosensitive medium and it consists in irradiating simultaneously at least a point of said support with write beams whereof the polarization is controlled for optical recording of a given non-linear susceptibility tensor on the photosensitive medium.

9 Claims, 2 Drawing Sheets (E contains one or more dyes of an azobenzene derivative)

METHOD FOR OPTICAL DATA RECORDING AND REPRODUCING

GENERAL FIELD OF THE INVENTION

The storage of data on a digital optical medium is playing an increasing role in information technologies. Although low-density or medium-density memories are already very widely used at lower hierarchical levels in all electronic information processing units, high-density storage memories with very rapid access are needed at various nodes upstream of more evolved systems such as communication networks, central computing units or multimedia terminals for the purpose of video or audio data storage. Increased strategic demand with regard to high-capacity memories, allowing for example easy and generalized distribution of multimedia documents in CD formats, has therefore been strongly expressed. Another major requirement relating to disk memories relies on the confidentiality and propriety of rights: digitized data can be easily duplicated insofar as read/write and encoding/decoding methods and the associated hardware and software are readily accessible. This is because uncontrolled access to insufficiently protected information can result in catastrophic damage in the fields of artistic production, multimedia distribution or security transactions.

Various types of recordable disks or memories have been designed and developed at the present time. Magnetic memories had been most widely used until the introduction of compact discs on a plastic substrate (CD) which have made the low-cost recording of digital data widely accessible. Optical CD technology is currently based on a simple process of etching impressions in a plastic substrate. Writing is carried out in high volume and at low cost using industrial embossing techniques. The presence or absence of these impressions is read by an optical probe beam, the reflection or the scattering of which on the etching allows binary information (presence or absence of an impression) to be decoded.

However, other techniques are available for recording information in optical form, holography being the most useful alternative. In this case, illumination leads to a modification in the recording medium, thereby allowing the information to be stored by spatially modulating the intensity of the write beam. Various physical mechanisms lend themselves to this application, depending on the nature of the photosensitive materials: the reorientation of molecules in a polymer matrix was recognized very early on, right from the start of the 70s, as a method of holographically storing information using a physical principle discovered at the start of the century and called the Weigert effect.

Such a medium consists, for example, of a polymer-based host-film doped by an azobenzene-type guest molecule. After irradiation within their absorption band, the molecules can become reoriented after photoisomerization cycles initiated by absorption of the incident light, this spectrum coinciding with the absorption band of the guest molecules. Irradiation by a linearly polarized beam causes axial reorientation of the molecules perpendicular to the polerization direction of the light. This mechanism induces a linear birefringence in the film which increases the refractive index perpendicular to the incident polarization of the pump. The presence or absence of birefringence can then be used for the binary encoding of information. It is therefore important to note that illumination by circularly polarized light or depolarized (i.e. randomly polarized) light induces an axial polarization perpendicular to the film, which therefore results in the erasure of the information recorded beforehand in the form of a transverse birefringence in the plane of the film (cf. for example *optically induced and erased birefringence and dichroism in azoaromatic polymers*, P. Rochon, J. Gosselin, A. Natansohn and S. Xie, Appl. Phys. Lett, 60(1), (1992), pages 4–5). The conventional Weigert effect results however in linear pumping process operating by direct absorption of a photon coming from the quasimonochromatic radiation of a single filtered lamp or a single laser source.

This effect may be generalized by two-photon pumping corresponding to irradiation with a wavelength shifted toward the infrared at mid-height of the absorption maximum of the photosensitive molecular species. Although a priori less effective than one-photon absorption, much work is currently being carried out on the use of two-photon pumping which allows penetration into the volume of the material, whereas the depth accessible by one-photon resonant absorption is limited by the depth of penetration (cf. the work by Paras Prasad et al., at the Suny University at Buffalo or by J. Perry et al. at the Jet Propulsion Lab. of Caltech; cf. also the following publication: "B. H. Cumpston, S. P. Ananthavel, S. Barlow, D. L. Dyer, J. E. Ehrlich, L. L. Erskine, A. A. Heikal, S. M. Kuebler, I. Y. Sandy Lee, D. McCord-Maughon, J. Qin, H. Röckel, M. Rumi, X. L. Wu, S. R. marder and J. W. Perry, Nature, Vol. 398, 1999, pages 51–54).

However, when the medium is irradiated by two mutually coherent beams at $\omega$ and $2\omega$ respectively, where $2\omega$ is in resonance with the absorption band of the photosensitive chromophores, under certain conditions the residual orientation becomes noncentrosymmetric (for example, polar if the oriented molecules are themselves dipolar) and no longer axial as in the case when irradiated separately at $\omega$ or $2\omega$. Such an orientation is compatible with the existence of physical properties associated with tensors of odd rank, thereby including in particular second-harmonic generation and three-wave mixtures. The most general configuration resulting in such breaking of the centrosymmetry is that of irradiation by three mutually coherent beams at three wavelengths $\omega_1+\omega_2=\omega$ (for example the pump and the signal and complementary beams of an optical parametric oscillator) with $\omega_3$ in resonance with the UV-visible absorption spectra of the photosensitive chromophore. The simplest case of irradiation at two wavelengths corresponds to the degenerate three-photon case with $\omega_1=\omega_2=\omega$ and $\omega_3=2\omega$. At the microscopic level, such a phenomenon may be interpreted as quantum interference between 1-photon and 2-photon absorption processes, which results in a noncentrosymmetric excitation probability and in breaking of the centrosymmetry by coupling of the process of de-excitation to a state whose structure is transiently modified (for example reversible photoisomerization as in the case of photochromic-type molecules which have an N=N double bond between two aromatic rings and thereby the possibility of reversible photoisomerization of the trans-cis-trans type).

PRIOR ART

In the case of a single linearly polarized beam incident normal to the recording medium, the molecules are thus reoriented axially, perpendicular to the polarization direction of the pump beam. It is known that a distinction may then be made between different polarization directions of the write beam resulting in different directions for the optical axis imprinted in the plane of the film, thus allowing the stored information density to be increased by increasing the number of possible birefringent configurations per pixel.

In the case of irradiation configuration using two mutually coherent wavelenghts, the two axial states can split into new states of polar symmetry as shown in table 1. For example, in the case of beams linearly polarized in a "vertical" direction has been established beforehand by a Weigert effect with horizontal polarization of the pump, so as to result in molecules oriented indiscriminately up or downward, after a second step of irradiation at two wavelenghts according to the polarization conditions defined above, new states are obtained which correspronod to molecules which are then preferentially oriented upward or preferentially oriented downward. The distinction between these two new states results from a method of controlling the phase between the two write beam at ω and 2ω.

It has been shown, in particular in:
S. Brasselet and J. Zyss, J. Opt. Soc. Am. B, Vol. 15(1), 257, 1998—*Feature issue on Organic and Polymeric nonlinear Optical Materials*, that these polarization effects may be associated with various write tensors and especially:

in the case of the one-photon Weigert effect, with an electromagentic field tensor of rank 2, $F^{(1)}$, which is defined by:

$$F^{(1)} = Re[E^{\omega} \otimes (E^{\omega})^*] \qquad (1)$$

where Re denotes the real part, $\otimes$ denotes the tensor product and * the conjugate; and in the case of the one-photon and two-photon degenerate interference effect using an infrared laser beam and its harmonic radiation, with an electromagnetic field tensor of rank 3, $F^{(2)}$ which is defined by:

$$F^{(2)} = Re[E^{\omega} \otimes E^{\omega} \otimes (E^{2\omega})^*] \qquad (2)$$

It will be noted that the notations defined here and in the rest of the present text are the same as those used in the aforementioned article, to which reference may advantageously be made.

The components of the electromagnetic field tensors $F^{(n)}$ can be expressed in invariant form in the formalism of tensor representations irreducible with respect to rotations as doubly indexed coefficients denoted $F_m{}^J$, where $J=0,1,2,3$ (up to the rank of the tensor, that is to say 2 in the case of $F^{(1)}$ and 3 in the case of $F^{(2)}$) and $-J \leq m \leq J$.

It has also been shown in the aforementioned article by Brasselet and Zyss that the linear and nonlinear photoinduced susceptibilities can be expressed, to a first-order approximation with respect to the write tensor, by the expressions:

$$\chi^{(1)j}M = \lambda_j^{(1)} F^{(1)j}m \text{ with } J=0.2 \qquad (3)$$

$$\chi^{(1)j}M = \lambda_j^{(2)} F^{(2)j}m \text{ with } J=1.3 \qquad (4)$$

where the coefficients $\lambda_j^{(1)}$ and $\lambda_j^{(2)}$ depend on the effectiveness of the write process, which itself depends on molecular parameters comprising inter alia the imaginary parts (at resonance) of the polarizability tensors $\alpha$ and $\beta$ and the efficiency of the coupling with structurally modified states coupled to the excited state and participating in the process in which the initial excitation undergoes relaxation. Such a dependence calling to be discussed on a case by case basis in view of the nature of the nonlinear photosensitive chromophore chosen.

The term $\chi^{(1)*}0$ (proportional to the Cartesian trace) corresponds to the isotropic contribution to the linear macroscopic polarizability while the term $\chi^{(1)2}m$ corresponds to the birefringence, with the indices $m \neq 0$ for describing the transverse birefringence in the plane of the film. Likewise, the coefficients $\chi^{(2)j}m$ with $J=1, 3$ are the components of the quadratic susceptibility with the indices $m \neq 0$ corresponding to the tensor coefficients in the plane of the film.

PRESENTATION OF THE INVENTION

An objective of the invention is to propose a technique allowing data to be stored in a photosensitive memory medium with a greatly increased density.

According to the invention, this objective is achieved by encoding the data according to various possible states for the various components of a nonlinear susceptibility tensor of the photosensitive medium and by simultaneously irradiating at least one point in said medium by write beams, the polarization of which is controlled in order for a given nonlinear susceptibility tensor to be optically recorded in the photosensitive medium.

For example, for binary data, the 0 level is associated with a zero component and the 1 level is associated with a nonzero component.

It is then possible to read the states of the various tensor components of the nonlinear susceptibility tensor recorded at said point in the support by irradiating said point with one or more read beams, the polarization of which is controlled, and by measuring the intensity of the response beam which results therefrom for the various polarization directions of its electric field which, in combination with that of the electric field of the read beam, correspond to the various components that it is desired to read.

Thus, to take the above example again, the intensity of the response beam is zero, for a given polarization direction of the read beam electric field and a given polarization direction of the response beam electric field, when the tensor component of the nonlinear susceptibility is zero; reading then makes it possible to deduce that the optically recorded binary information for this tensor component is the value zero. When, for this polarization direction of the read beam electric field and this polarization direction of the response beam electric field, the intensity of the response beam is not zero, it is deduced that the optically recorded binary information for this tensor component is the value 1.

It will be understood that, by thus exploiting the tensorial character of the nonlinear susceptibility, the information density that it is possible to record at the same point in a photosensitive medium is increased.

Moreover, according to another advantageous aspect of the invention, the write beams are two coherent beams, the phase of which is controlled so as to control the sign of the components of the nonlinear susceptibility tensor.

This is because, as will be understood on reading the description which follows, it turns out that it is possible to control the sign of the components of a nonlinear susceptibility tensor by controlling the phase shift between the write beams.

Control of the sign of the tensor components that it is thus possible to achieve makes it possible to further increase the information storage density at the optical recording point.

The method proposed by the invention is furthermore advantageously complemented by the various features which follow, taken by themselves or in any of their technically possible combinations:

the optical recording of a linear susceptibility tensor, which corresponds to a first encoding level, is superimposed on the optical recording of a nonlinear susceptibility tensor, which corresponds to a second encoding level and which does not appear on reading the first encoding level;

the write beams are two in number and have cocircular and countercircular polarizations, respectively;

the optical memory medium contains a dye which is an azobenzene derivative;

the medium is irradiated with various sets of write beams which correspond to different optical recording wavelengths;

the medium contains a dye which has orientation properties at the various wavelengths which correspond to various sets of write beams used; and the medium contains several dyes.

PRESENTATION OF THE FIGURES

Further features and advantages of the invention will become more apparent from the description which follows. This description is purely illustrative and nonlimiting, and must be read in conjunction with the appended drawings, in which.

DESCRIPTION OF POSSIBLE WAYS OF IMPLEMENTING THE INVENTION

Figure 1:
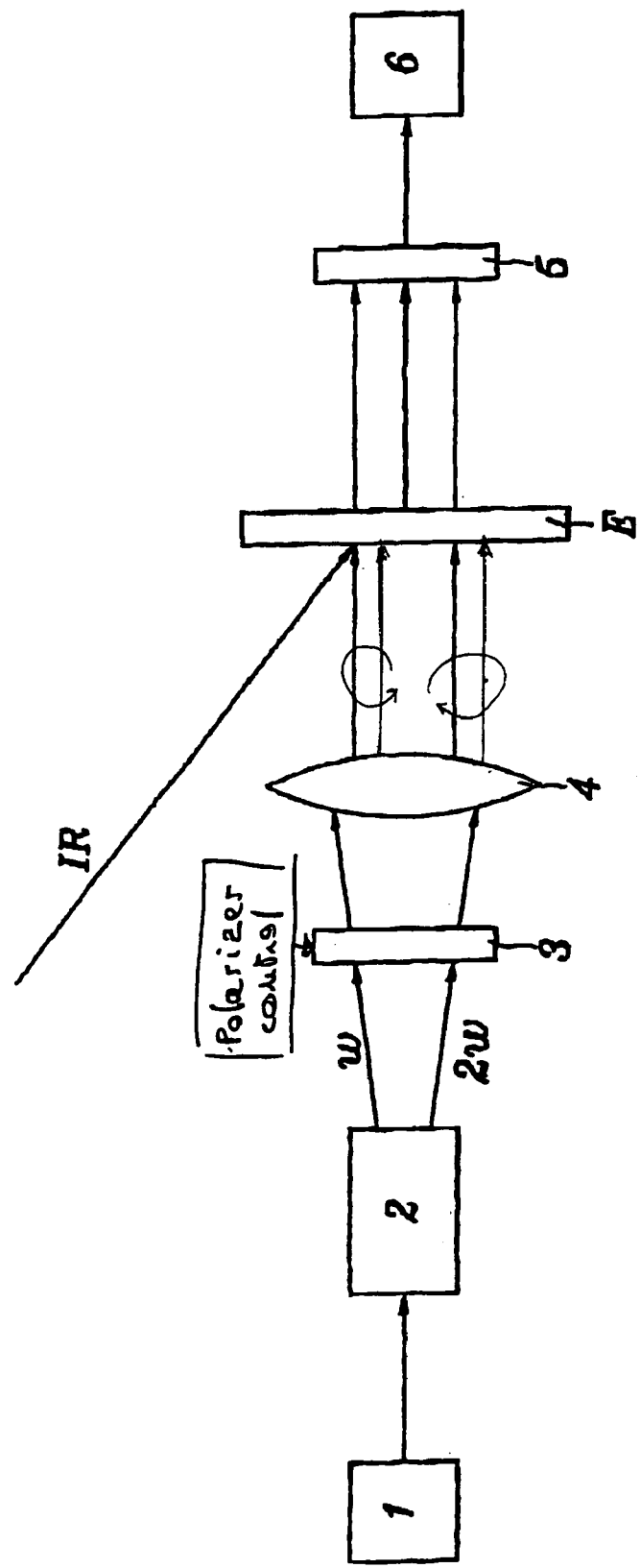
FIG. 1 illustrates schematically one possible setup for carrying out optical recording according to the invention.

The information storage in tensor form proposed by the invention is advantageously implemented in the case of optical media in which it is possible to optically record physical effects expressed by 2nd-order tensors (the usual linear case corresponding to rank 2 of the dielectric tensor subjacent to the refractive index and to the birefringence) or 3rd-order tensors (the case of the quadratic nonlinear optic) or even higher-order tensors.

To take an example, using only parallel linear polarizations and an azopolymer-type recording medium, the four molecular orientation states shown in table 1 of the annex of the description are simply obtained. It is possible to go from four states to seven states by adding, to the configurations already shown in table 1, three other configurations corresponding to write beams at $\omega$ and $2\omega$, and these being polarized "horizontally" and no longer only vertically, and a one-photon beam (simple Weigert effect) polarized "vertically".

The various components of the corresponding write tensor are detailed in the appended table 2. To identify the various alignment directions corresponding to the various write tensors is then a little more difficult to represent than in the previous case corresponding to table 1.

Furthermore, the number of possible encoding states may be further increased by exploiting, as proposed by the invention, the tensorial character of the susceptibility tensor.

It may also be increased even more by suitably controlling the phase shift between the write beams and also makes it possible, for the same point, to increase the encoding states corresponding to different molecular orders by varying the components of the nonlinear susceptibility tensor.

If we consider incident write beams polarized linearly in the same direction and making an angle $\phi$ with an x-axis of a reference frame associated with the support in which optical recording takes place, the following expressions are then obtained for the nonzero Cartesian components of the write tensor for the case of the 1-photon process:

$$F_{xx}^{(1)}=E^2 \cos^2 \phi, F_{yy}^{(1)}=E^2 \sin^2 \phi, F_{xy}^{(1)}=E^2 \cos \phi \sin \phi \quad (5)$$

or the equivalent expressions in the spherical formalism:

$$F^{(1)0}_0 = -\frac{1}{\sqrt{3}}E^2, \quad F^{(1)2}_0 = -\frac{1}{\sqrt{6}}E^2, \quad (6)$$

$$F^{(1)2}_2 = \frac{1}{2}E^2 e^{2i\varphi}, \quad F^{(1)-2}_{-2} = \frac{1}{2}E^2 e^{-2i\varphi}$$

Likewise, the following equations are obtained for the Cartesian components of the write tensors corresponding to the case of the one-photon/two-photon combined effects:

$$F_{xxx}^{(2)}=E^3 \cos^3 \phi \cos(\Delta\phi), F_{xxy}^{(2)}=E^3 \cos^2 \phi \sin \phi \cos(\Delta\phi) \; F_{xyy}^{(2)}=E^3 \cos \phi \sin^2 \phi \cos(\Delta\phi), F_{yyy}^{(2)}=E^3 \sin^3 \phi \cos(\Delta\phi) \quad (7)$$

and their counterparts in spherical formalism:

$$F^{(2)1}_1 = \sqrt{\frac{3}{10}}E^3 e^{i\varphi}\cos(\Delta\phi), \quad F^{(2)-1}_{-1} = -\sqrt{\frac{3}{10}}E^3 e^{-i\varphi}\cos(\Delta\phi) \quad (8)$$

$$F^{(2)3}_1 = \frac{\sqrt{3}}{2\sqrt{10}}E^3 e^{i\varphi}\cos(\Delta\phi), \quad F^{(2)3}_{-1} = \frac{\sqrt{3}}{2\sqrt{10}}E^3 e^{-i\varphi}\cos(\Delta\phi)$$

$$F^{(2)3}_3 = -\frac{1}{2\sqrt{2}}E^3 e^{3i\varphi}\cos(\Delta\phi), \quad F^{(2)3}_{-3} = \frac{1}{2\sqrt{2}}E^3 e^{-3i\varphi}\cos(\Delta\phi)$$

with the following notations for the incident electric field products:

$$E^2=\|E^\omega E^\omega\|, E^3=\|E^\omega E^\omega (E^{2\omega})^*\|$$

$\Delta\phi$ being the phase shift between the various write beams and being equal to $2\phi^\omega-\phi^{2\omega}$.

As may be seen from these expressions, one major difference between the one-photon or two-photon processes and the one-photon/two-photon combined process is the contribution, specific to this latter case, of a propagative phase shift factor between the beams at $\omega$ and $2\omega$ resulting from the dispersion of the refractive index in the medium.

By controlling this phase shift factor, the orientation direction of the molecules is controlled.

As an example, such optical recording may be carried out in a film of polymethyl methacrylate substituted with the dye conventionally known by the name DR1 (disperse red one).

The degree of substitution is, for example, 0.3 per monomer of the polymer.

This material is dissolved in a 1,1,2-trichloroethylene solvent (with a concentration of 10% by weight) and then the layers of the photosensitive material are deposited by the spin-on technique, at 2000 revolutions/minute, on a glass substrate until a film thickness of the order of 1 µm has been obtained.

Optical recording then takes place by means of a setup of the type shown in FIG. 1.

This setup includes a laser source 1 which in this case is a pulsed YAG laser, with pulse widths of the order of a picosecond, at a frequency of 10 Hz and an energy of a few mJ.

The beam output by this source 1 is injected into a KDP doubling crystal 2. The two output by this doubling crystal 2 then have wavelengths which are, on the one hand, 1.064 micrometers (for the beam of frequency ω) and, on the other hand, 532 nm (for the beam of frequency 2ω). These two beams are injected into polarization control means 3 (a controllable polarizer 3 coupled to a control that polarizes the beam at a frequency of ω through a cocircular polarizer portion and the beam at 2ω through a countercircular polarizer) and then, through optical means 4, into the specimen E which bears the photosensitive film.

Simultaneously with this recording, an infrared read beam IR is injected onto that point in the specimen where the optical recording took place.

The output response beam from the film is detected, after being filtered by an infrared filter 5, by photodetection means 6.

Figure 2:
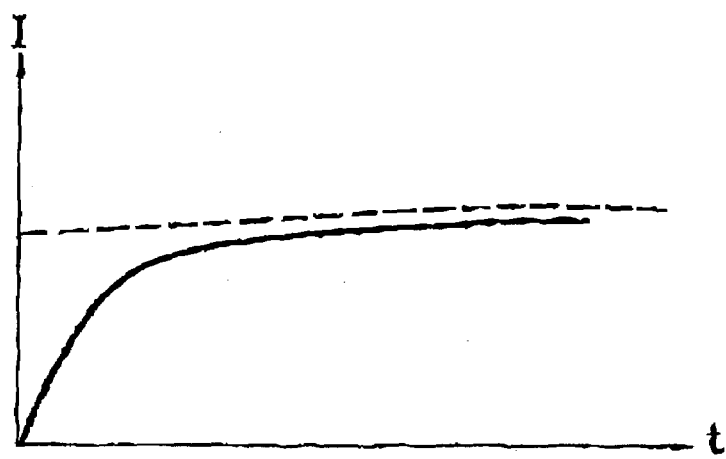
FIG. 2 is a graph on which the variation with time of the intensity measured by the photodetector in a setup of FIG. 1 during optical recording of a tensor component has been plotted.

The optical recording process is interrupted when the intensity of the signal detected by the means 6 becomes stable, as shown in the graph in FIG. 2.

By varying the polarization of the write beams, it is possible to successively record states chosen for the various tensor components of the nonlinear susceptibility.

Figure 3:
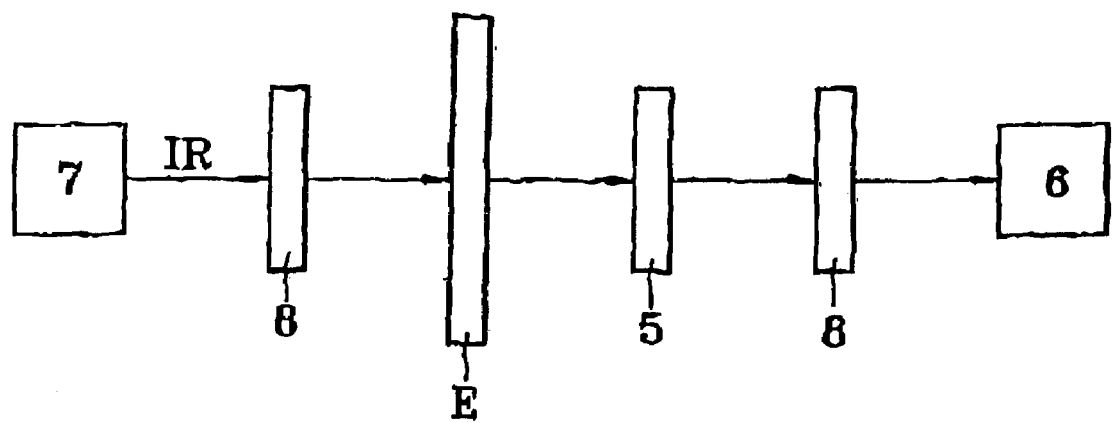
FIG. 3 illustrates schematically one possible read setup.

The information thus optically recorded is read by means of a setup like that shown in FIG. 3, which includes a source 7 for emitting a read beam, in this case an infrared beam, toward a specimen E. This setup furthermore includes photodetection means 6 placed on the opposite side of the specimen from the source 7, filtering means 5 interposed between the specimen E and the photodetection means 6, and means 8 for controlling the polarization directions of the electric field of the write beam and of the response beam transmitted to the detection means.

Moreover, if it is desired to carry out optical recording by controlling the sign of the tensor components, optical means are used during writing which comprise a dichroic plate for splitting the beam of frequency ω from the beam of frequency 2ω in order to introduce a phase shift in one of these two beams with respect to the other.

The sign of the tensor components is read by using a reference material, the sign of the various tensor components of which is known, onto which reference material is sent the same read sign as onto the photowritten material. The response beams output by the two materials are summed. The tensor component analyzed is of one sign or the other depending on whether the photodetected intensity is greater or less than the intensity photodetected in the case of the reference material alone.

Advantageously, the invention may be applied to concealing information in an optical medium.

This is because, in the case of recording a molecular order using beams at ω and 2ω having cocircular and countercircular polarizations respectively, there can be no birefringence in the plane of the film since the beams are circularly polarized. Reading, using a "conventional" one-photon process for example at normal incidence between polarizers crossed at 45° with respect to the polarization direction of a single presumed write beam is then incapable of detecting the information recorded by the nonlinear process.

It will be understood that such a configuration can be used for the purposes of concealing an optical recording unbeknown to the current user.

Another example of implementation may also be the following.

Consider a linear birefringence write configuration with linearly polarized light and N specific write polarization orientations. Adding a further beam, coherent with the first and linearly polarized, allows the number of states to be divided, by varying the phase shift between two beams. This results in 3N states associated with the birefringence. Using a circularly polarized beam, it is possible to generate nine orientational states, namely one isotropic state plus four (cocircular and countercircular combinations) times two (for various phase shift) states. This thus results in 3N+9 possible states for encoding each pixel.

The N=4 case is easily achievable in practice and corresponds to orientations of the polarization directions angularly separated by 45°, which is not an adverse requirement for reading between polarizers. This then results in 21 states per pixel. This means that this technique allows the storage density to be increased by at least a factor of 10.

Superimposing on information encoded linearly further information encoded nonlinearly has a great advantage when it is desired to conceal information, for example for the purpose of authenticating documents or for the purpose of hiding information. What is therefore obtained is in fact a method similar to that of writing by means of a sympathetic ink.

At a first access level, the user will have access only to the information encoded in a conventional linear manner. The information stored by nonlinear writing—which then corresponds to a restricted access level—is then absolutely invisible to him. It becomes accessible only to those having the equipment for nonlinear reading.

The access times for recording or reading the physical effects that have just been described depend greatly on the polymer host matrix, the viscosity of which governs, through intermolecular interaction, the time to reorient the photosensitive nonlinear chromophore.

The duration of the pulses also plays an important role in the orientational dynamics, short durations being optimal durations [*Optical poling of azo-dye doped thin film using an ultra-short pulse laser*, K. Kitaoka, J. Si, T. Mitsuyu and K. Hirao, Appl. Phys. Lett., 75(2), (1999), pages 157–159].

These access times may be shortened further by using a parallel write/read configuration employing the possibilities of the optical system in terms of parallelism.

Moreover, the intrinsic properties of the material itself are also important. The nature of the tensor coupling between the optical write tensor and the molecule depends on the nonlinear properties of the molecule and on its specific tensorial characteristics. Thus, the possibility of writing information having characteristics of tensorial symmetry called "octupolar" (resp. "dipolar") symmetry depends on the presence of components of the same nature in the molecular tensor and therefore on the structure of the molecule (for example, the symmetry of all its substituents in the case of an aromatic ring substituted laterally with charge transfer groups).

Octupolar molecules are distinguished by a clear absence of a permanent dipole at the molecular level, while still being noncentrosymmetric. Tetrahedral molecules are particularly useful in this regard since their linear polarizability (the tensor α) is furthermore characterized by an absence of anisotropy (e.g. δα=0, and it is this tensor δα which is the microscopic origin of the birefringence and of the orientation caused by the optical Kerr effect). Nonlinear information without any linear birefringence can therefore be recorded so as to result in a medium containing encrypted nonlinear information and having a linear level blank of any recording.

Another important aspect is the nature of the photosensitive material and its physicochemical characteristics. One particularly relevant family is that of dyes derived from azobenzenes, these dyes being known for their molecular reorientability and their functionalizability in the case of quadratic ONL by the grafting of electron-donating and electron-accepting groups.

Materials that can be used are, for example, in the form of a host film receiving guest molecules, or else in the form of optionally crosslinkable side-chain or main-chain grafted polymers. As matrices, liquid crystals or liquid-crystalline polymers may also be envisioned. Any other material capable of containing molecules suitable for photo written reorientation and ONL potential (both for ensuring orientational coupling with the write tensor field and to ensure second-harmonic generation reading) are possible candidates. In addition, the physical structure of the recording medium may be designed in a multilayer architecture, each layer exhibiting a specific property. An optically nonlinear layer may be deposited on another substrate and thus lend itself to the physical superposition of layers of information of different nature.

The above examples were restricted to a single active entity in the film and to a single set of wavelengths per write/read spectrum (in this case a wavelength doublet). However, it is possible to generalize the principle of the technique that has just been described to several molecular entities having absorption bands with separate spectral media so as to benefit from the advantages of wavelength multiplexing and/or several sets of write/read wavelengths. This is because the effectiveness of the recording/writing in nonlinear optical mode is sensitive to the resonance between the UV-visible molecular transitions and the wavelength of the beam of higher energy among the three (or the two in the degenerate case), the yield exhibiting a more or less pronounced maximum under quasiresonance conditions.

The following configurations may therefore be combined:
a single species of functional molecules with a broad spectrum (inhomogeneous broadening possibly amounting to several $cm^{-1}$ at room temperature and corresponding to the random dispersion of the relative configurations of the functional molecule with respect to the host matrix), various spectral properties, corresponding to reorientations photowritten at several wavelengths, of which are used;
a mixture of two (or more) dyes having separate but overlapping spectra makes it possible to extend the recordable spectral width and to multiply the number of recordable states per spectrum (using the above scheme, that is to say one set of wavelengths or more) by the number of spectrally addressable species (taking into account the utilizable excursion range of the available sources). A mixture may also be envisioned in which the species are chosen so as to minimize the spectral intervals between peaks so as to ensure quasicontinuous spectral coverage over a broad band and thus ensure the most independent possible write/read mode for the write/read wavelength (e.g. broadband, spectrally noncritical or "hole-burning" character. Consequently, the one-photon and two-photon write wavelengths will be simultaneously quasiresonant for a given molecular species. Reading at a nonresonant fundamental wavelength is valid for any molecular species.

TABLE 1

Simple configurations that can be observed by using linearly polarized beams with control of their relative phase.

| State (molecular orientation in the plane) | | | | |
|---|---|---|---|---|
| Nature of the order | Isotropic | Axial | Axial and noncentrosymmetric | Axial and noncentrosymmetric |
| Polarization of the write beams and phase shift | None or circular polarization | One linearly polarized beam | Two linearly polarized beams | Two linearly polarized beams |
| Birefringence | None | Yes | Yes | Yes |
| ONL tensor | None | None | Yes, > 0 | Yes, < 0 |

TABLE 2

Cartesian and spherical tensor components of the optical write tensor in the case of cocircular and coutercircular polarizations with coherent beams; Cartesian representation: each component of the table below must be multiplied by a factor of magnitude $E^3/2\sqrt{2}$.

| | $F_{XXX}$ | $F_{XXY}$ | $F_{YYX}$ | $F_{YYY}$ |
|---|---|---|---|---|
| $E^{\omega}(\sigma+)E^{2\omega}(\sigma+)$ | $\cos(\Delta\phi)$ | $-\sin(\Delta\phi)$ | $\cos(\Delta\phi)$ | $-\sin(\Delta\phi)$ |
| $E^{\omega}(\sigma-)E^{2\omega}(\sigma-)$ | $\cos(\Delta\phi)$ | $\sin(\Delta\phi)$ | $\cos(\Delta\phi)$ | $\sin(\Delta\phi)$ |
| $E^{\omega}(\sigma+)E^{2\omega}(\sigma-)$ | $\cos(\Delta\phi)$ | $-3\sin(\Delta\phi)$ | $3\cos(\Delta\phi)$ | $-\sin(\Delta\phi)$ |
| $E^{\omega}(\sigma-)E^{2\omega}(\sigma+)$ | $\cos(\Delta\phi)$ | $3\sin(\Delta\phi)$ | $3\cos(\Delta\phi)$ | $\sin(\Delta\phi)$ |

Spherical representation: each component of the table below must be multiplied by a factor of magnitude $E^3$.

| | $F_1^1$ | $F_{-1}^1$ | $F_3^3$ | $F_1^3$ | $F_{-1}^3$ | $F_{-3}^3$ |
|---|---|---|---|---|---|---|
| $E^{\omega}(\sigma+)E^{2\omega}(\sigma+)$ | $\frac{1}{2}\sqrt{\frac{3}{5}}e^{-i\phi}$ | $-\frac{1}{2}\sqrt{\frac{3}{5}}e^{i\phi}$ | $\frac{1}{4}e^{i\phi}$ | $\frac{1}{4}\sqrt{\frac{3}{5}}e^{i\phi}$ | $-\frac{1}{4}\sqrt{\frac{3}{5}}e^{-i\phi}$ | $-\frac{1}{4}e^{-i\phi}$ |
| $E^{\omega}(\sigma-)E^{2\omega}(\sigma-)$ | $\frac{1}{2}\sqrt{\frac{3}{5}}e^{i\phi}$ | $-\frac{1}{2}\sqrt{\frac{3}{5}}e^{-i\phi}$ | $\frac{1}{4}e^{-i\phi}$ | $\frac{1}{4}\sqrt{\frac{3}{5}}e^{-i\phi}$ | $-\frac{1}{4}\sqrt{\frac{3}{5}}e^{-i\phi}$ | $-\frac{1}{4}e^{i\phi}$ |
| $E^{\omega}(\sigma+)E^{2\omega}(\sigma-)$ | $\sqrt{\frac{3}{5}}e^{-i\phi}$ | $-\sqrt{\frac{3}{5}}e^{i\phi}$ | $e^{i\phi}$ | $\frac{1}{2}\sqrt{\frac{3}{5}}e^{-i\phi}$ | $-\frac{1}{2}\sqrt{\frac{3}{5}}e^{i\phi}$ | $-e^{-i\phi}$ |

-continued

| | $F^1_1$ | $F^1_{-1}$ | $F^3_3$ | $F^3_1$ | $F^3_{-1}$ | $F^3_{-3}$ |
|---|---|---|---|---|---|---|
| $E^\omega(\sigma-)E^{2\omega}(\sigma+)$ | $\sqrt{\dfrac{3}{5}}\,e^{i\phi}$ | $-\sqrt{\dfrac{3}{5}}\,e^{-i\phi}$ | $e^{-i\phi}$ | $\dfrac{1}{2}\sqrt{\dfrac{3}{5}}\,e^{i\phi}$ | $-\dfrac{1}{2}\sqrt{\dfrac{3}{5}}\,e^{-i\phi}$ | $-e^{i\phi}$ |

TABLE 3

Various possible levels of information protection by hybrid linear mode/nonlinear mode encoding.

| Application | Linear reading | Linear writing | NL reading | NL writing |
|---|---|---|---|---|
| Read only concealed nonlinear layer; "sympathetic ink" | Yes | No | No | No |
| Concealed nonlinear layer; "sympathetic ink" | Yes | Yes | No | No |
| Read NL layer; "sympathetic ink", authentacation | Yes | Yes | Yes | No |
| Very high-density read/write NL layer | Yes | Yes | Yes | Yes |

The invention claimed is:

1. A method for optical recording of data on a photosensitive memory medium, characterized in that the data are encoded according to various possible states for the various components of a nonlinear susceptibility tensor of the photosensitive medium and in that at least one point in said medium is simultaneously irradiated by write beams, the polarization of which is controlled in order for a given nonlinear susceptibility tensor to be optically recorded in the photosensitive medium.

2. The method as claimed in claim 1, wherein the write beams are two coherent beams, the phase of which is controlled so as to control the sign of the components of the nonlinear susceptibility tensor.

3. The method as claimed in claim 2, wherein the optical recording of a linear susceptibility tensor, which corresponds to a first encoding level, is superimposed on the optical recording of a nonlinear susceptibility tensor, which corresponds to a second encoding level and which does not appear on reading the first encoding level.

4. The method as claimed in claim 3, wherein the write beams are two in number and have cocircular and countercircular polarizations, respectively.

5. The method as claimed in claim 4, wherein the optical memory medium contains a dye which is an azobenzene derivative.

6. The method as claimed in claim 5, wherein the medium is irradiated with various sets of write beams which correspond to different optical recording wavelengths.

7. The method as claimed in claim 6, wherein the medium contains a dye which has orientation properties at the various wavelengths which correspond to various sets of write beams used.

8. The method as claimed in claim 6, wherein the medium contains several dyes.

9. A method for optical recording and reproducing of data on a photosensitive memory medium, wherein the data are encoded according to various possible states for the various components of a nonlinear susceptibility tensor of the photosensitive medium and in that at least one point in said medium is simultaneously irradiated by write beams, the polarization of which is controlled in order for a given nonlinear susceptibility tensor to be optically recorded in the photosensitive medium, and to read the states of the various tensor components of the nonlinear susceptibility tensor recorded at said point in the medium, said point is irradiated by one or more read beams, the polarization of which is controlled, and the intensity of the response beam which results therefrom is measured for the various polarization directions of its electric field which, in combination with that of the electric field of the read beam, correspond to the various components that it is desired to read.

* * * * *